(No Model.) 2 Sheets—Sheet 1.

S. R. BAILEY.
CARRIAGE.

No. 447,752. Patented Mar. 10, 1891.

Witnesses:
Eugene Humphrey
Ralph W. E. Hopper

Inventor:
Samuel R. Bailey
per T. W. Porter Atty (No Model.) 2 Sheets—Sheet 2.
S. R. BAILEY.
CARRIAGE.
No. 447,752. Patented Mar. 10, 1891.
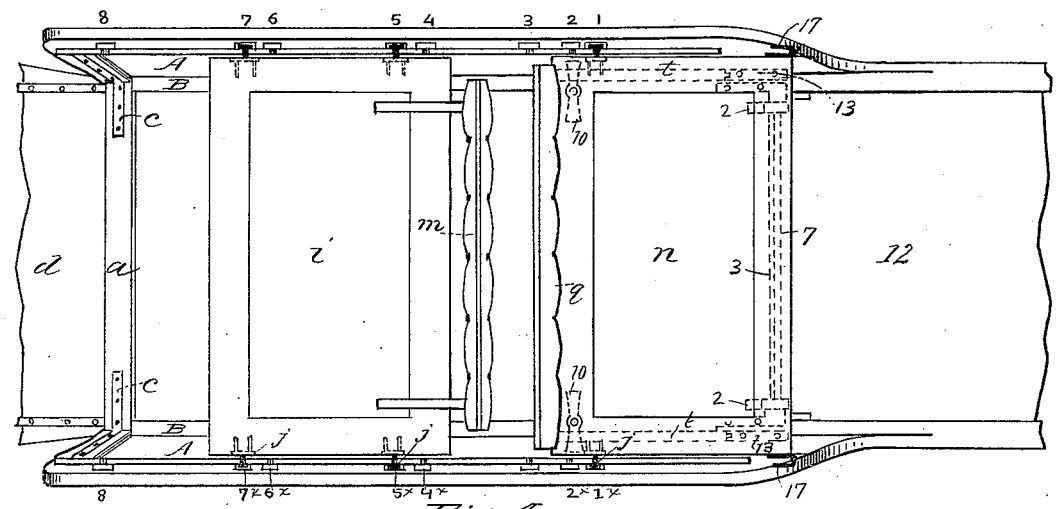
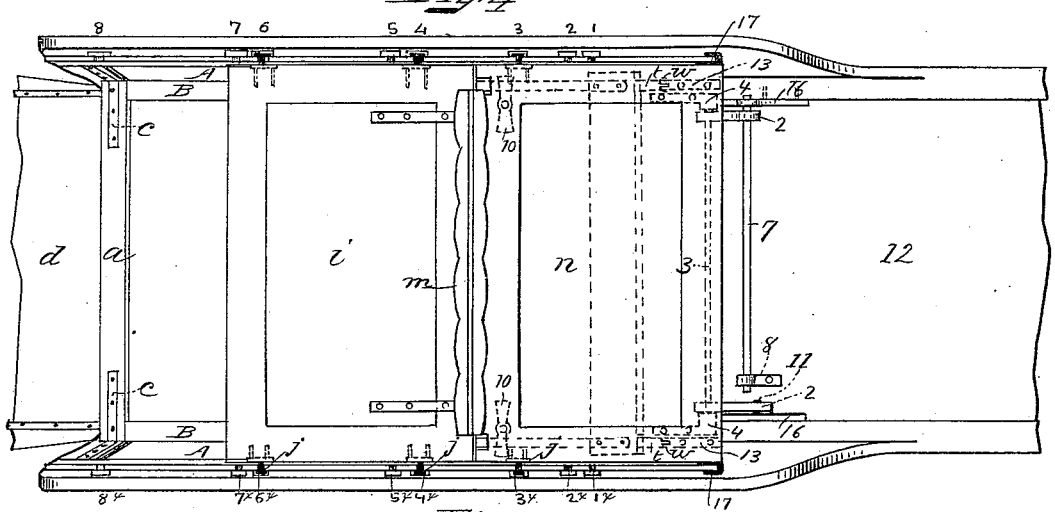
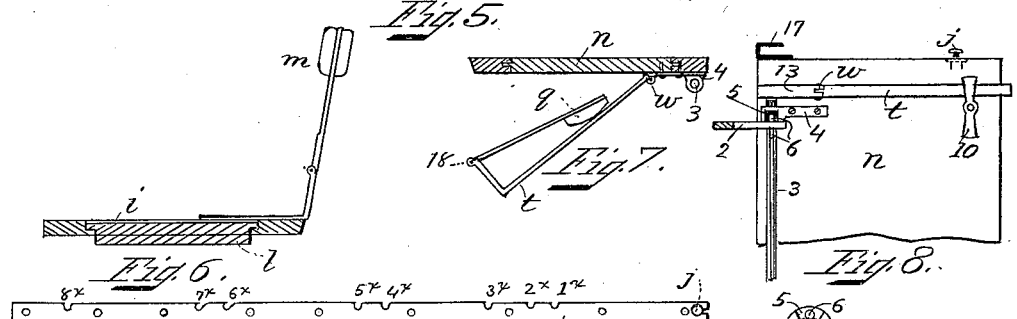
Witnesses:
Eugene Humphrey
Ralph W. E. Copper
Inventor:
Samuel R. Bailey
by T. W. Porter, Atty.
THE NORRIS PETERS CO., PHOTO-LITHO., WASHINGTON, D. C.

UNITED STATES PATENT OFFICE.

SAMUEL R. BAILEY, OF AMESBURY, MASSACHUSETTS.

CARRIAGE.

SPECIFICATION forming part of Letters Patent No. 447,752, dated March 10, 1891.

Application filed December 24, 1890. Serial No. 375,733. (No model.)

*To all whom it may concern:*

Be it known that I, SAMUEL R. BAILEY, of Amesbury, in the county of Essex and State of Massachusetts, have invented a new and useful Improvement in Carriages, which will, in connection with the accompanying drawings, be hereinafter fully described, and specifically defined in the appended claims.

Figure 1:
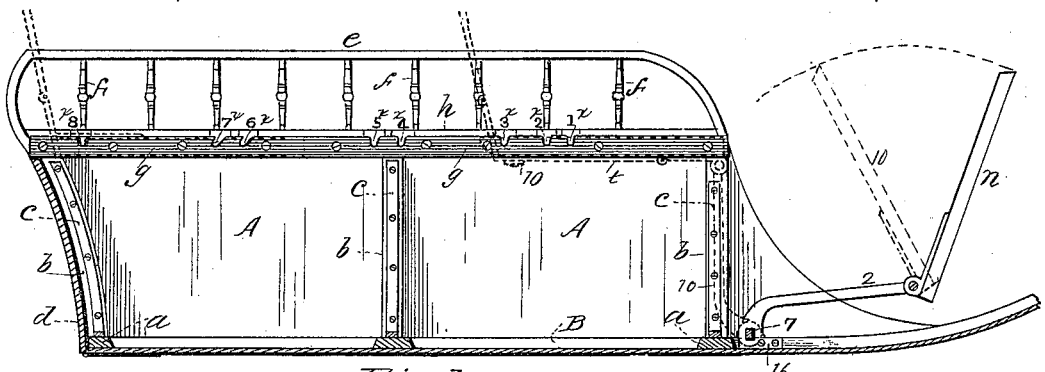
Figure 2:
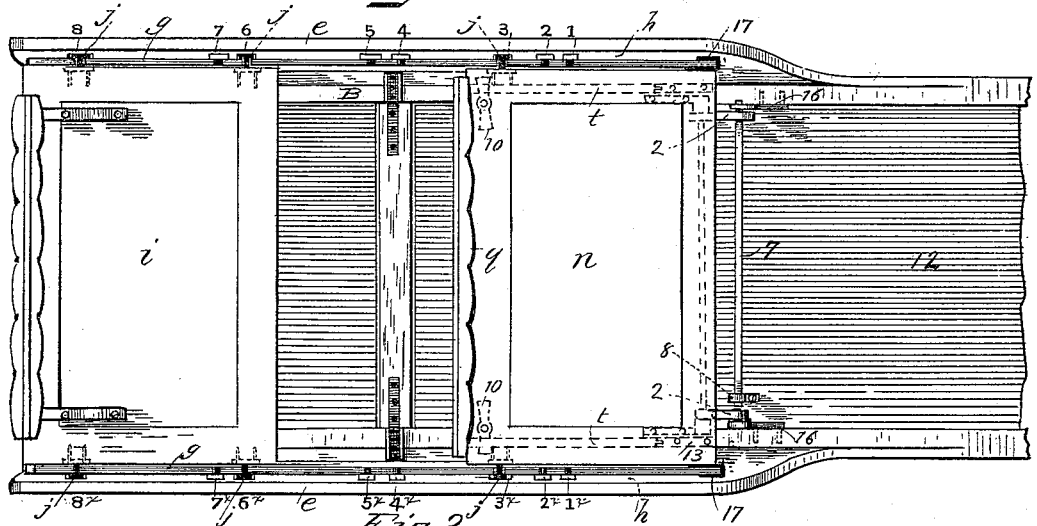
Figure 3:
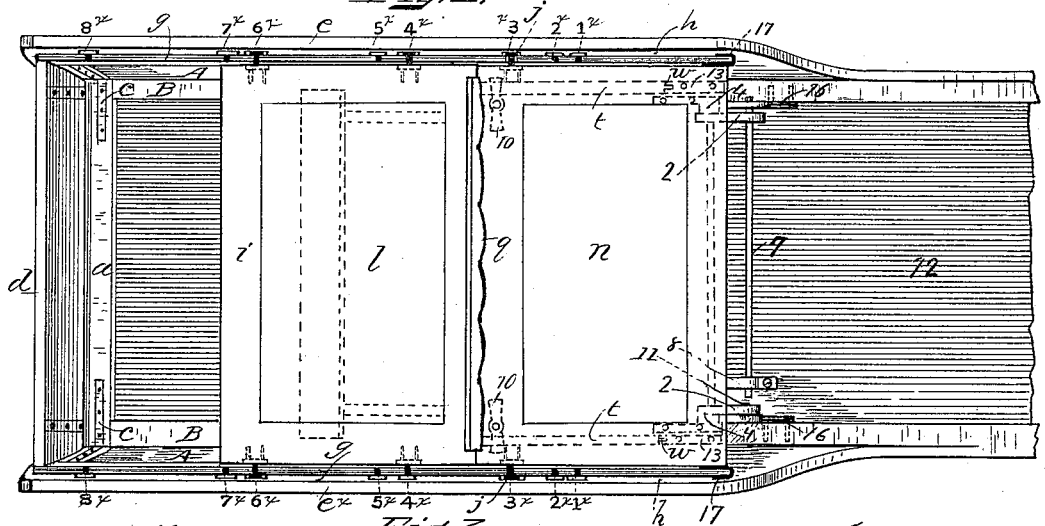

In said drawings, Figure 1 is a sectional elevation of a carriage-body embodying my invention, the section being vertical and longitudinal and viewed as from the right-hand side of the vehicle, the seats being indicated in their position for use and as facing forward by dotted lines and the front seat being shown by solid lines as turned forward. Fig. 2 is a top plan of the body and seats when arranged as indicated by dotted lines in Fig. 1. Fig. 3 is a view similar to Fig. 2, but shown as a single-seat vehicle, the rear seat being turned upside down and constituting an ornamental panel. Fig. 4 is a view similar to Figs. 2 and 3, but showing the rear seat reversed by turning it end for end to serve as a rearward-facing seat, each seat furnishing its own back. Fig. 5 is a view like Fig. 4, except that the back of the front seat is lowered beneath the seat and the latter is arranged nearer to the back seat to coact with the back thereof. Fig. 6 is a detailed sectional elevation of the back seat to be described. Fig. 7 is a similar view of the front seat to be described. Fig. 8 is a detached under side plan view of a portion of the front seat, showing the construction of the jumping-irons. Fig. 9 is a side elevation of the seat-hanger plate. Fig. 10 shows a modification of the elevating-springs of the front seat. Fig. 11 shows the rocking joint of the front seat.

This invention relates to carriages provided with adjustable seats; and it consists in features of novelty and the combinations thereof, as will, in connection with the accompanying drawings, be hereinafter pointed out and claimed.

Referring again to said drawings, A represents the side panels of the body, and B the side sills thereof, which are united by the cross-sills $a$, at the end of each of which is a standard $b$, secured in sills B and to panels A, the sills $a$ and standards being re-enforced and rigidly united by metal knees $c$.

At the top of panels A is secured a bar $h$, to the inner face of which is secured the hanger-plate $g$, to be further described. A bent rail $e$ is secured to bar $h$, and with the sticks $f$ constitutes the seat ends. A tailboard $d$ is hinged to the rear lower corners of the body to close that part when raised, and also to serve when lowered as a foot-board for the occupants of the rear seat when it is faced to the rear.

The front seat is shown at $n$ and is provided with the jumping-irons 2, attached to it near its front edge by means of rock-shaft 3, to which said irons are rigidly secured, and eye-plates 4, secured to the seat, and which have shaft 3 as their pivot. One of said jumping-irons is pivoted to the side sill by the pivot 11 of plate 16, secured to the sill, as shown, while the other iron is secured upon the square portion of torsion-spring bar 7, which is adjacent thereto rounded and pivoted in sill-plate 16, while the opposite square end of the spring-bar is secured in keeper 8, secured to the floor 12.

To confine the capacity of movement of the seat upon rock-shaft 3 to a limited rocking movement, a seat or recess 5 is cut in the eye of eye-plate 4, and a pin 6, secured between the rock-shaft and eye of the jumping iron, extends into said recess and limits the movement of the seat upon the shaft, as shown in Fig. 11, such limited motion being requisite in order that when the seat is turned forward, as shown, to admit access to the rear seat, the front seat may be rocked forward, as indicated by dotted lines in Fig. 1, to give a greater space between it and the end of the side panels A, and yet prevent the seats hitting and injuring the dasher. The rear portion of the seat is provided with the hanger-studs $j$, the neck of which fits easily into the seats (marked from $x'$ to $x^8$) in hanger-plate $g$, while the heads enter the seats formed in side rail $e$, to which said plates are secured, all of said seats in the plates and rail being formed to receive either of the hanger-studs, which are all alike in that respect. The front seat is provided with a back $q$, hinged, as shown, to angle-iron $t$, that is hinged at $w$ to plate 13, secured beneath seat $n$, said bar $t$ being supported by button 10 when back $q$ is raised to be used as such. The rear seat $i$ is provided with a double-faced back $m$, hinged to standards rigidly secured to the seat, as shown. By such construction I am enabled to produce the following variations in the positions and ways of arranging the seats.

When it is desired to use both seats at the same time as forward-facing seats, the studs $j$ of the front seat are placed in seat $x^3$ of hanger-plate $g$ and the studs of seat $i$ are placed in seats 6 and 8, respectively, of said plate, which arrangement positions the seats to give the occupants their due respective space, as shown in Figs. 1 and 2.

When but one seat is to be used, the front seat will be arranged as last described, while the rear seat will be turned upside down upon its studs in seat $x^6$, so that its then front studs $j$ will be in seats $x^4$ and its then rear studs will remain in seats $x^6$ of plates $g$, as shown in Fig. 3, said seat being formed with raised ornamental deck-panel 1, that is in view when the seat is thus turned forward.

When used with the front seat facing forward and the rear seat facing backward and with the back of each seat in position to coact therewith, the front seat is jumped forward, so as to place its studs $j$ either in seats $x'$ or $x^2$ of plate $g$, while the rear seat $i$ is turned end for end and its studs are placed in seats $x^5$ and $x^7$ of the hanger-plate, as shown. When the seats are to be used as last described, but with one back serving for both seats, the back of the front seat is folded down as shown in Fig. 7, and the studs of said seat are arranged in seats $x^3$ of plate $g$, while the studs of seat $i$ are arranged in seats $x^4$ and $x^6$ of said plate, thereby bringing its back in proper relation to the front seat to serve as the back of both seats, the tail-board being duly opened out, as indicated, to serve as a foot-board whenever the rear seat is arranged as a rearward-facing seat.

By arranging the front seat in the position shown in either Figs. 1 or 4 and removing the rear seat, which can be done instantly, space is provided for bulky but not over-heavy baggage in the rear portion of the body, which space may be materially increased by duly arranging the tail-board.

The front seat may be provided with a catch 17, which engages the front end of hanger-plates $g$, as shown, or a slot may be cut in the end of said plate, as shown in Fig 9, in which a stud $j$, duly arranged upon the seat, would engage to lock the seat to the body. The utility of the torsion-spring 7 consists in the fact that it may be so proportioned as to very nearly raise the front seat after the same has been turned forward, thus relieving the user of the exercise of the greater part of the force hitherto required to raise the seat. Instead of said torsion-spring, a coiled spring 14 may be arranged in a case 15, as shown in Fig. 10, the jumping-irons being pivoted in the shell of the case and the ends of the spring being respectively anchored to said shell and the jumping-irons, so that their stored force would tend to raise the seat when it was turned forward.

The seats $p^6$ and $p^7$ are undercut to render them hooking, so as to engage the studs of the rear seat when facing in either direction and secure it from turning over backward upon the rear studs $j$.

I claim as my invention—

1. In an adjustable-seat carriage, and in combination with said seats provided with suitable supporting projections to coact therewith, the hanger-plates secured to the sides of the body at the proper height from the floor and having seats to receive said supporting projections, substantially as specified.

2. In combination with the front and rear seats provided with their supporting projections or studs, the hanger-plates duly secured to the body-sides and provided with a series of seats for said studs so arranged as that said seats may be adjusted therein in the positions specified.

3. The combination, with the front seat provided with its pivoted jumping-irons and the hanger-studs near its rear edge, of the hanger-plates having a series of seats for said studs, whereby the position of the front seat may be varied to coact with the rear seat, substantially as specified.

4. In a two-seat carriage, the combination, with the front seat, of the rear seat provided with the hanger-studs, and the hanger-bars having seats to receive said studs, both said studs and stud-seats being so relatively arranged that the seat may be turned forward upon its front pivots to serve as a deck-panel or to serve as a back seat, substantially as specified.

5. In a two-seat carriage, the combination, with the front seat, of the rear seat provided with hanger-studs, and the hanger-plates provided with hanger-seats, said studs and hanger-seats being so relatively arranged that the rear seat may, by turning it end for end, be arranged to serve either as a forward or rearward facing seat, substantially as specified.

6. In a two-seat carriage, and in combination with the front seat, a back-supporting iron formed of three parts or members, one part being secured to the under side of the seat, an intermediate part hinged to that so secured beneath the seat, and a third member hinged to said intermediate part and secured to the back, whereby the back may be lowered beneath the seat and folded down, substantially as specified.

7. In combination with a jump or turn-down seat, a spring combined and connected therewith in manner substantially as specified, whereby the turning down of the seat creates stress upon the spring and the latter co-operates in elevating the seat.

SAMUEL R. BAILEY.

Witnesses:
 T. W. PORTER,
 EUGENE HUMPHREY.